(No Model.)
H. F. WELCH.
SHAFT SUPPORTER FOR VEHICLES.
No. 395,641. Patented Jan. 1, 1889.
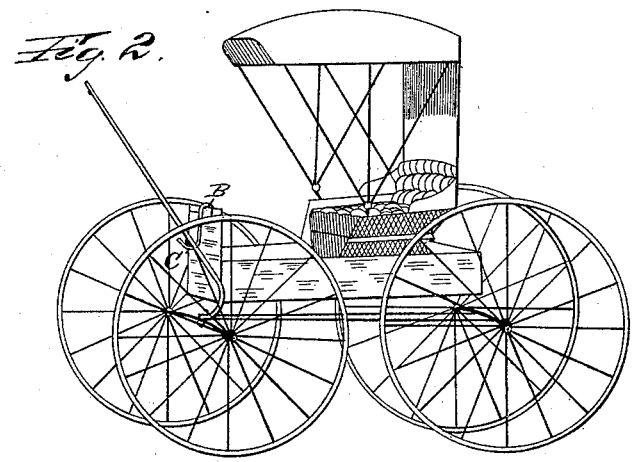
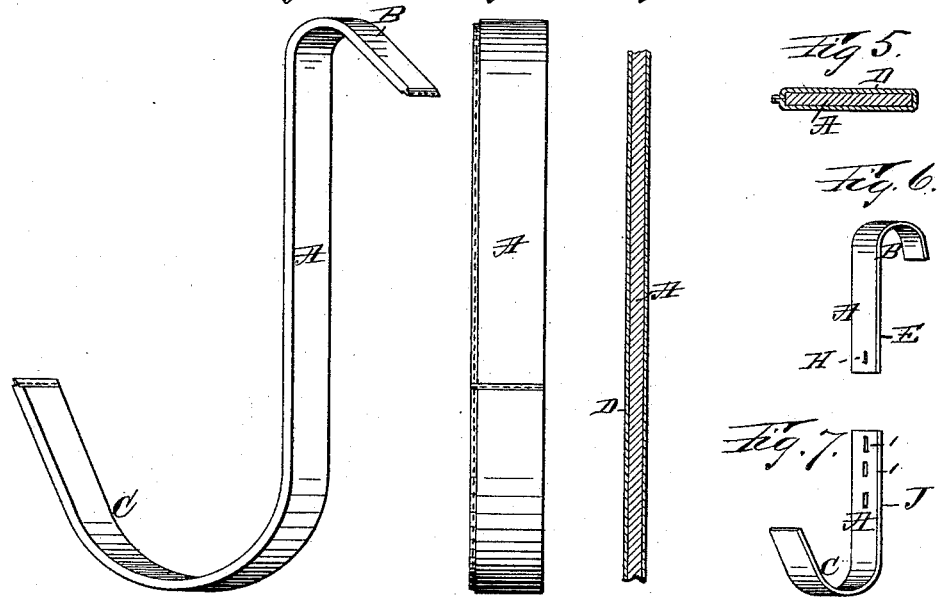
Witnesses:
John W. Ripley.
John W. Appleton.
Howard F. Welch, Inventor.
By his Attorney S. J. Gordon.

UNITED STATES PATENT OFFICE.

HOWARD F. WELCH, OF RICHFIELD SPRINGS, ASSIGNOR TO MARGARET HOWARD CHASE, OF NEW YORK, N. Y.

SHAFT-SUPPORTER FOR VEHICLES.

SPECIFICATION forming part of Letters Patent No. 395,641, dated January 1, 1889.

Application filed October 30, 1888. Serial No. 289,576. (No model.)

*To all whom it may concern:*

Be it known that I, HOWARD F. WELCH, of Richfield Springs, county of Otsego, State of New York, have invented a new and useful Improvement in Shaft-Supporters for Shafts of Vehicles, which is fully set forth in the following specification and accompanying drawings, in which—

Figure 1 is a perspective view of my improved shaft-supporter; Fig. 2, the same applied to a carriage; Fig. 3, the device a little more than a quarter-turn to the right from the position in Fig. 1; Figs. 4 and 5, longitudinal and lateral sections of a portion of the same, showing the application of the covering to the supporter; Figs. 6 and 7, a modified form of the supporter in two pieces.

The purpose of my invention is to provide a convenient, cheap, and durable means of supporting the shafts of vehicles, to economize space in staples and decrease the liability to injury and defacement from leaving them unsupported or kept raised by the insertion of an unprotected stick, as has heretofore been the general usage.

I construct my improved shaft-supporter A of a metallic bar having an open hook, B, at the upper end and an open hook, C, at the lower end, opposed to hook B, both shaped as indicated in Fig. 1. I cover the entire bar and hooks with a soft or yielding material, D, preferably leather, as exhibited in Figs. 4 and 5, to prevent marring or chafing the carriage upon which the device is used. A pad or cushion of rubber or cloth may be readily inserted at the hollows or ends of the hooks, where they would bear upon the vehicle, for still better protection from defacement when covering D is applied.

To better adapt the supporter to vehicles of different dimensions, it may be divided into two sections, as shown in Figs. 6 and 7, the upper part, E, provided with a button at H, to be inserted in one of the slots I I of the lower part, J; or they may be united by any of the common devices for attaching and holding two plain surfaces in contact.

The device is applied as follows: The shafts of the vehicle are elevated, as shown in Fig. 2. The larger hook, C, of the supporter is caught under the cross-bar of the shafts and the smaller hook, B, upon and over the upper edge of the dash-board, maintaining the shafts in an elevated position out of the way.

The supporter is equally applicable to supporting a wagon-pole. The upper end of the supporter is caught on the bolster-bar of the wagon when the construction of the wagon makes it feasible.

What I claim as new, and desire to secure by Letters Patent, is—

As a new article of manufacture, a metal shaft-supporter made in a single piece, to sustain the shafts of vehicles, with opposed open hooks upon each end and provided with a soft or yielding covering, substantially as shown and described.

HOWARD F. WELCH.

Witnesses:
JAS. A. STORER,
MELVIN D. DRAKE.